June 16, 1964 KATSUYA ATSUMI 3,137,454

AUTOMATIC STOP MECHANISM FOR TAPE RECORDERS

Filed Aug. 10, 1962 7 Sheets-Sheet 1

INVENTOR.

KATSUYA ATSUMI

BY [signature]

ATTORNEY

June 16, 1964 KATSUYA ATSUMI 3,137,454

AUTOMATIC STOP MECHANISM FOR TAPE RECORDERS

Filed Aug. 10, 1962 7 Sheets-Sheet 2

INVENTOR.

BY KATSUYA ATSUMI

ATTORNEY

INVENTOR.
KATSUYA ATSUMI
BY
ATTORNEY

June 16, 1964 KATSUYA ATSUMI 3,137,454

AUTOMATIC STOP MECHANISM FOR TAPE RECORDERS

Filed Aug. 10, 1962 7 Sheets-Sheet 4

INVENTOR.
KATSUYA ATSUMI
BY [signature]
ATTORNEY

INVENTOR.
KATSUYA ATSUMI
BY [signature]
ATTORNEY

June 16, 1964 KATSUYA ATSUMI 3,137,454

AUTOMATIC STOP MECHANISM FOR TAPE RECORDERS

Filed Aug. 10, 1962 7 Sheets-Sheet 6

INVENTOR.

KATSUYA ATSUMI

BY [signature]

ATTORNEY

June 16, 1964 KATSUYA ATSUMI 3,137,454

AUTOMATIC STOP MECHANISM FOR TAPE RECORDERS

Filed Aug. 10, 1962 7 Sheets-Sheet 7

INVENTOR.

KATSUYA ATSUMI

BY

ATTORNEY 3,137,454

AUTOMATIC STOP MECHANISM FOR TAPE RECORDERS

Katsuya Atsumi, Tokyo, Japan, assignor to Akai Electric Company Limited, Tokyo, Japan, a Japanese corporation Filed Aug. 10, 1962, Ser. No. 216,165
4 Claims. (Cl. 242—55.12)

The invention relates broadly to the magnetic tape drive in a magnetic tape recorder. More specifically, it relates to an automatic stop mechanism for stopping the said drive mechanically as well as electrically when a release or loosening of the tension in the tape caused by a possible loosening, cut-off or winding-up thereof should be sensed while the tape is running and the machine is under operation for recording or play-back, especially in the case of the latter.

In the conventional art, various means are proposed and utilized to shut-off automatically the electrical connection between the current source and the machine while the machine is in the recording or playback service, upon the completion of at least a predetermined recording or play-back job.

However, it is to be noted that with use of such conventional automatic shut-off arrangements current only is cut-off and the arrangement of the tape drive is left unchanged as in the case of its actual position. More specifically, the idler cooperating with the pinch roll is, in these cases, kept under pressure for a long time. As is commonly known, such idler is made from rubber or the like, so that it may be subjected to a permanent deformation upon such a long-extended duration of pressurized state, which deformation would be permanently set. A such permanent deformation as set-in will invite a variation in the tape feed, when the machine runs, which fact gives rise to inferiority in the tone quality, when the recorded signals are reproduced. For this reason, it will be clear that the arrangement of the tape drive must be returned from its operative to its original or rest position when the current source has been automatically cut-off for the purpose of stopping the machine for a reasonable long time upon taking place and loosened or cut-off condition of the running tape. Such a cause will be met, when a person is enjoying a play back music on the machine and the tape has come to its termination when he or she has fallen into a sleep. If the machine is not equipped with proper automatic cut-off means for automatic stopping of the tape drive and for automatic cutting-off the current supply from the machine, the machine will run over-night, or even after the automatic stoppage the tape drive will be kept in its operative position while the current supply is kept alive.

The main object of the invention is, therefore, to provide an automatic current cut-off mechanism assembled with an automatic tape drive stop mechanism assembled and arranged with each other in such a way that only after the mechanical stop mechanism has been brought into operation and the tape drive arrangement has been completely restored to its original or normal state the current cut-off is actuated so as to de-energize the machine.

In the present machine, an operating means for a microswitch for cut-off the current source is mounted on the main brake lever included in the mechanical tape drive stop mechanism, said lever is also operable manually, when it is desired to do so.

With such an arrangement, however, current supply may be always cut-off when the brake lever is brought into its operating or set position. Actuation of the brake lever may take place while either rewinding or high speed feeding the tape. If a sudden stop is made in these cases, wherein naturally the brake means are in their off-service position, a breakage of the tape may take place.

It is therefore a further object of the invention to provide the combined mechanical and electric mechanism of the kind referred to above, wherein the aforementioned microswitch cannot interrupt the current supply to the machine under selected conditions of the operation thereof, even though the mechanical stop has been brought into actuation to stop the tape drive in the aforementioned sense.

Another object of the invention is to provide a combined mechanism above referred to, which is highly simple in its design, reliable in its operation, and low in its manufacturing costs.

Various further and more specific objects, features and advantages of the invention will appear from the description given below, taken in conjunction with the accompanying drawings illustrating by way of example a preferred embodiment of this invention.

Figure 1:
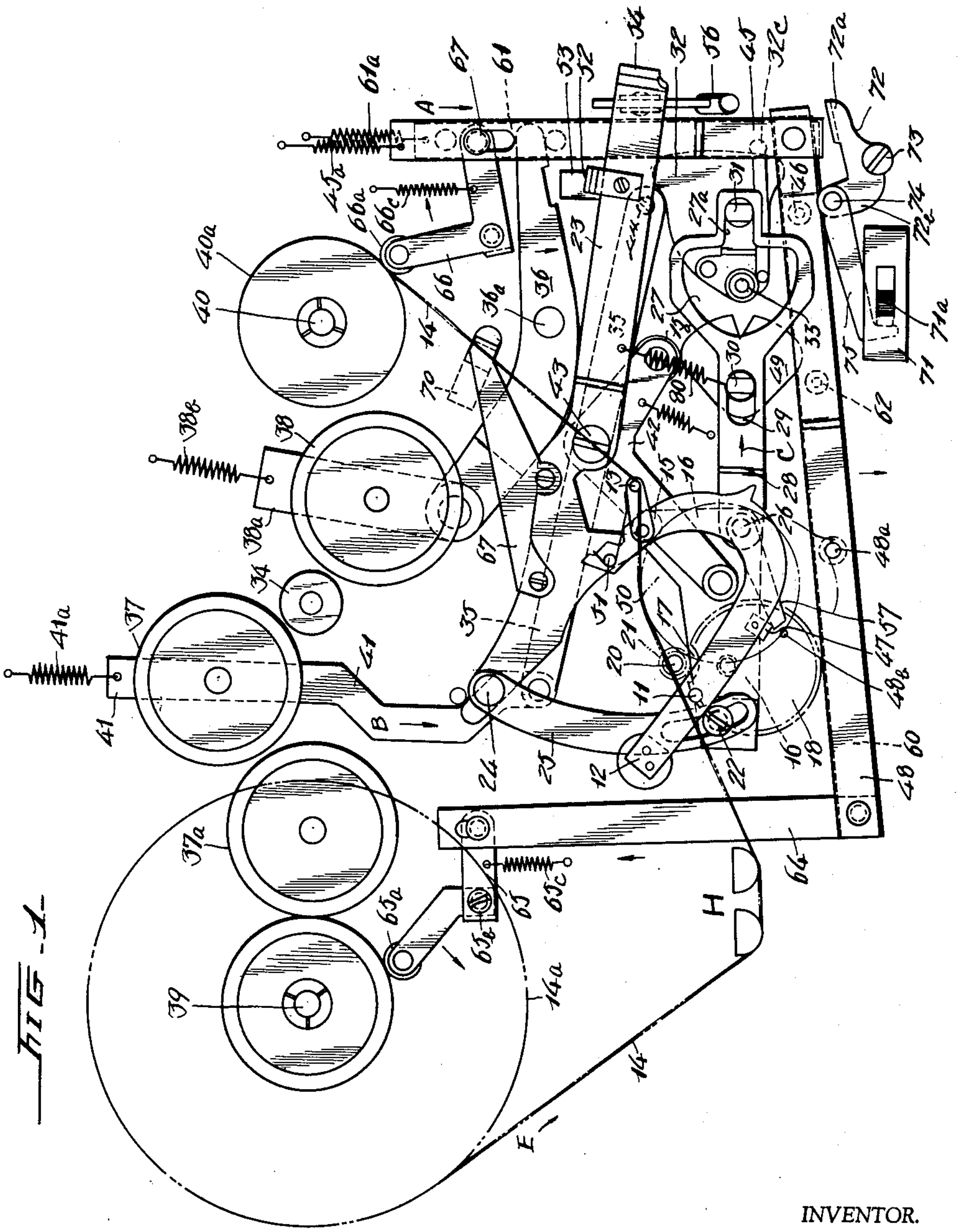
FIG. 1 is a top plan view of an automatic stopping and switching mechanism according to the invention, wherein however a plurality of operative constituents and the chassis for mounting the said mechanism have been omitted for simplification and the mechanism is illustrated in its rest position.
Figure 2:
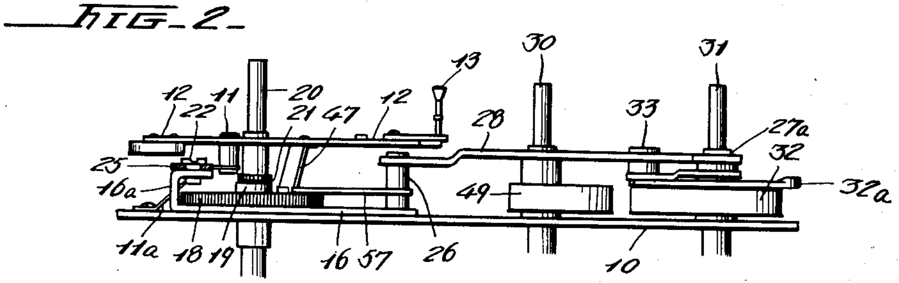
FIG. 2 is a front view of part of the mechanism, illustrative of several mechanical operative constituents thereof.
Figure 4:
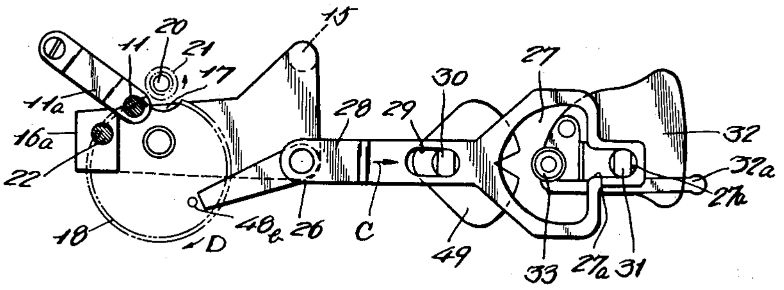
FIG. 4 is a top plan view of a plurality of working parts of the mechanical stop mechanism, together with a first and a second switch shafts assembled together.
Figure 3:
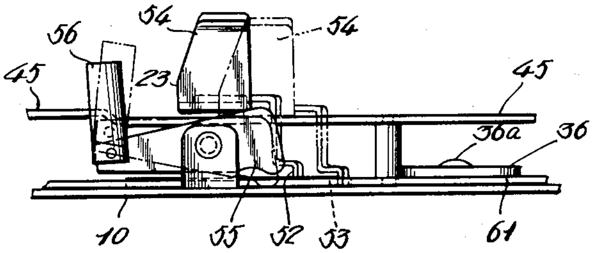
FIG. 3 is a side view or part of the mechanism, substantially illustrative of the main brake lever together with a push button type means for releasing the said lever from its set or operative position to its ready-for-operative position.
Figure 9:
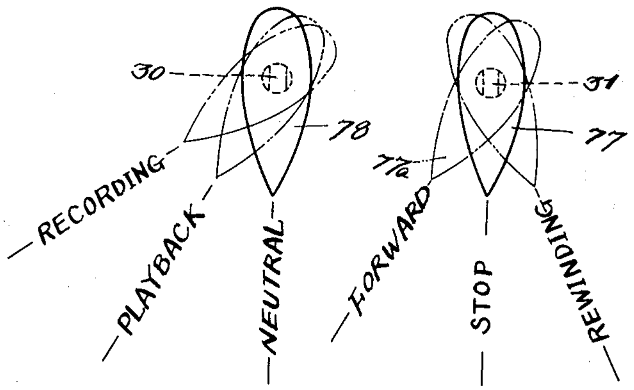
FIG. 9 is an explanatory diagram illustrative of the operative positions of the said both knobs.

In the drawings, a substantially hook-shaped lever 12 is pivotally mounted at an intermediate point nearer to one end thereof on a pivot 11, which is in turn fixedly supported through a support 11*a* (FIGS. 2 and 4) on a chassis 10 illustrated a part thereof only in FIGS. 2 and 3. At the opposite or tip end of the said lever 12, a feeler pin 13 is mounted and normally kept in contact with an elongated magnetic tape, which is illustrated only in FIG. 1 by a chain-dotted line 14 schematically and shown as released from a feed spool 14*a* again only diagrammatically illustrated. The advancing direction of the tape is shown in the same figure by a small arrow E. It will be seen that the tape is kept in sliding contact with a conventional head assembly H arranged alongside the path extending between the feed spool 14*a* and the feeler 13. A rocker plate 16, most clearly seen from FIG. 4, is provided with a depending pivot 15 fixed at one of the corners of said plate, said pivot being turnably mounted in the chassis 10, although not shown. A toothed wheel 18 having a plain recess 17 is eccentrically mounted and turnably mounted on the rocker plate 16 by means of a pivot 19 and adapted to cooperate with a pinion 21 formed on a capstan spindle 20, which turns in the counter-clockwise direction in FIG. 1 when the machine operates. The opposite end of the rocker 16 is shaped in a channel section as at 16*a* and connected adjustably with an elongated main or emergency brake lever 23 at its one end by virtue of an arc-shaped connecting rod 25, which is held in position by means of a set screw 22 and a pivot pin 24. The rocker 16 is pivotally connected at its one corner as at 26 opposite the pivot 15 with one end of a further lever 28, the opposite end of which is shaped in an enlarged eye 27. The extreme end of said eye 27 is formed into a slot 27*a*, through which extends stem 31 of a conventional three-way control switch for quick winding, neutral and rewinding, the operating knob 77 attached thereto and referred as "the first control knob" throughout herein is shown in FIG. 9, although the seitch gear thereof has been omitted for simplification. A cam 32 is fixed on said stem 31 and a stopper roll 33 is turnably mounted on said cam, said roll serving to limit the operating range of the first control knob by engagement with any one of the both corner wall portions of said enlarged eye opening 27, as will be clearly seen from FIG. 4. The lever 28 is formed at its intermediate portion with a slot 29, through which the stem 30 of a conventional control switch for recording and playback passes, only the operating knob 78 attached thereto and herein termed "the second control knob" is shown again in FIG. 9, although the switch gear thereof has been equally omitted for simplification.

A main drive shaft 34 is arranged to be driven, for instance, in the counter-clockwise direction by a main drive motor M (FIG. 10) direct-coupled to the lower end thereof. Idler wheels 37 and 38 are shiftably mounted in the neighborhood of the drive shaft and may be brought into engagement therewith, respectively by actuation of related levers 35 and 36, as in the conventional technique. When the former idler 37 is brought into contact with the drive shaft 34, a supply reel spindle 39 is brought into driving connection with the drive shaft 34 through the intermediary of wheels 37*a* and 37. In the similar manner, when the latter idler 38 is brought into operative engagement with the drive shaft 34 the idler is caused simultaneously to contact with a take-up reel spindle 40, and motion will be therefore transmitted therefrom to the spindle again as in the conventional manner. Idler wheel 37 is turnably mounted on a support bar 41, which is pivotally connected at its one end with the aforementioned rocker lever 35. The latter lever is pivotally mounted at its intermediate point on a common pivot 43 for brake lever 23 and pinch roll arm 42.

Figure 5:
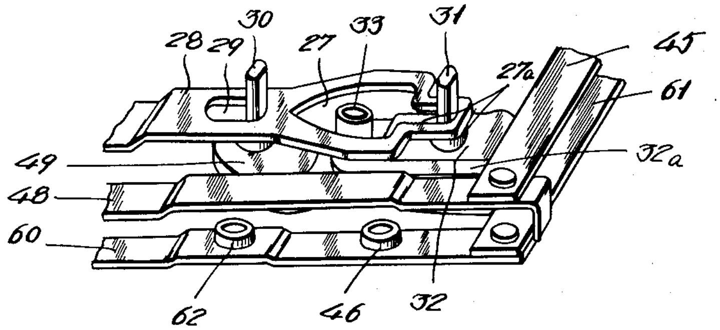
FIG. 5 is a perspective of a lever arrangement together with the above first and second switch shafts.

Rocker lever 35 is provided at its opposite end with a follower roller 44 and kept in resilient contact with the cam 32 under the influence of a tension spring 41*a* attached to the wheel carrying end of the bar 41. In the proximity of the opposite rise of the cam 32 is arranged a further follower roller 46 (FIG. 5), which is mounted on a further rocker lever 60, the latter being pivotally mounted on a pivot pin 48*a* (FIG. 1). The lever 60 is pivotally connected with a connecting rod 61, which is provided at its opposite end with a tension spring 61*a* (FIG. 3). In the proximity of this spring, the rod 61 is pivotally connected with the aforementioned rocker arm 36 which is in turn pivotally supported as at 36*a* and linked to a further rod 38*a* which mounts turnably thereon the rubber idler 38, a tension spring 38*b* urging the last mentioned rod to move in the upward direction in FIG. 1. A still further follower roller 62 adapted to cooperate with a cam 49 fixed to the switch shaft 30, and the aforementioned follower 46 adapted to cooperate with the cam 32, are turnably mounted on the aforementioned lever 60.

A rocker lever 48 is pivoted on the pivot pin 48*a* and arranged substantially in an overlapped manner to the lower lever 60, so far as its mechanical movement is concerned. More specifically, the lever 48 is linked at its one end with a connecting rod 45, which is urged to move upwardly in FIG. 1 under the influence of a tension spring 45*a* attached to the opposite end of the rod. The lever 48 is provided fixedly at its intermediate point and on its upper surface with a stop 63 (FIG. 1), which cooperates with a pawl-like projection 12*a* formed integrally with lever 12, when the stop mechanism is in its completely non-operative position. For this purpose, the lever 12 is urged to rotate in the clockwise direction by a spring (not shown). The opposite end of lever 48 is linked to a connecting rod 64, which is in turn operatively connected with a brake carrier 65 pivotable on a pivot 65*b*, and the brake shoe 65*a* on the carrier is normally kept in braking contact with the tape-delivery reel-carrying disc of spindle 39.

In the similar manner, the upper end of connecting rod 61 (FIG. 1) is linked to a brake carrier 66 pivotable on a pivot 66*a* and having a brake shoe 66*b* and an urging spring 66*c*. The shoe 66*b* is normally kept in braking engagement with the take-up reel-carrying disc 40*a*. The brake lever 23 mounts fixedly thereon a support 67 as most clearly seen from FIG. 12, which support passes through an opening 68 in chassis 10 and carries a switching member or connector 69 (see FIG. 10) for a microswitch 70 (FIG. 12) mounted on the back surface of chassis 10 and illustrated for simplicity by a couple of stationary contacts 70*a* and 70*b* in FIG. 10.

Figures 10, 11, 12:
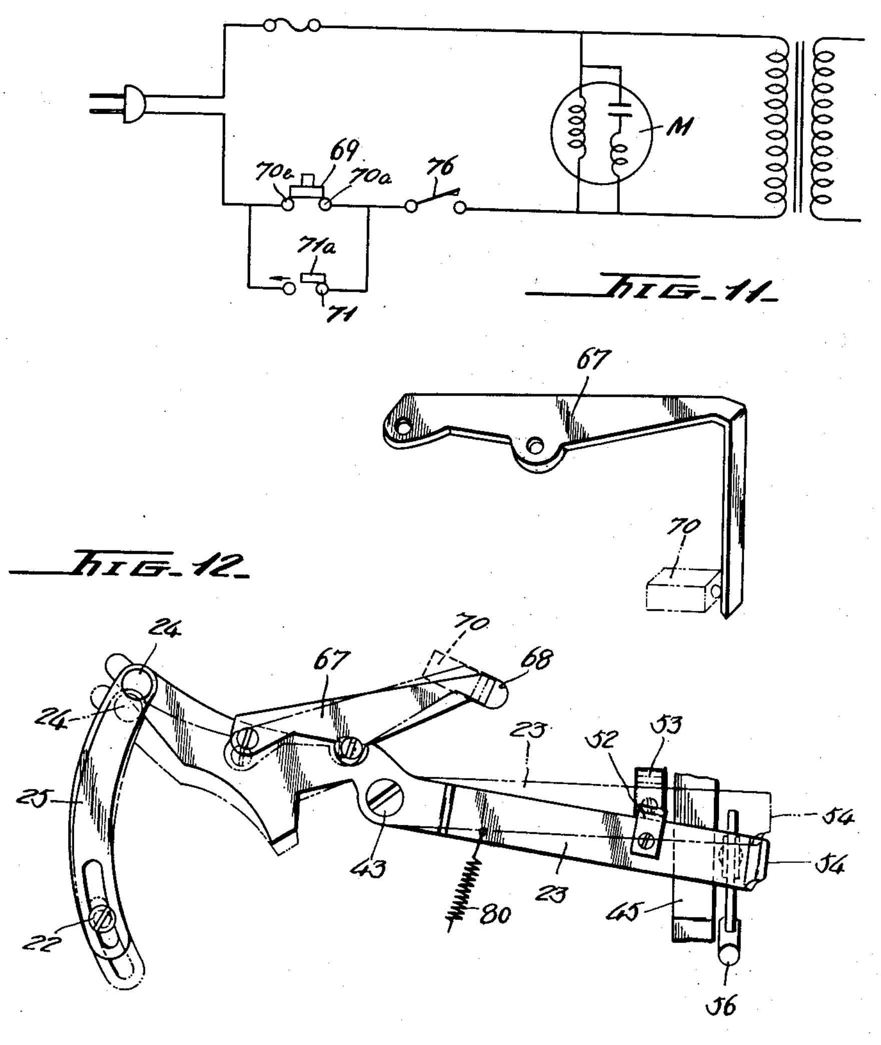
FIG. 10 is a circuit diagram of the electrical connections of the main drive motor circuit.
FIG. 11 is a perspective of a microswitch included in the above circuit and controlled by an actuating member mounted on the said main brake lever.
FIG. 12 is an enlarged top plan view of the main brake lever together with a plurality of related parts.

A further switch 71 (FIG. 1), so-called "sleeping switch," is provided on chassis 10 in the neighborhood of the right-hand end of lever 48 and inserted in parallel to the microswitch in the main drive motor circuit (FIG. 10).

Figure 6:
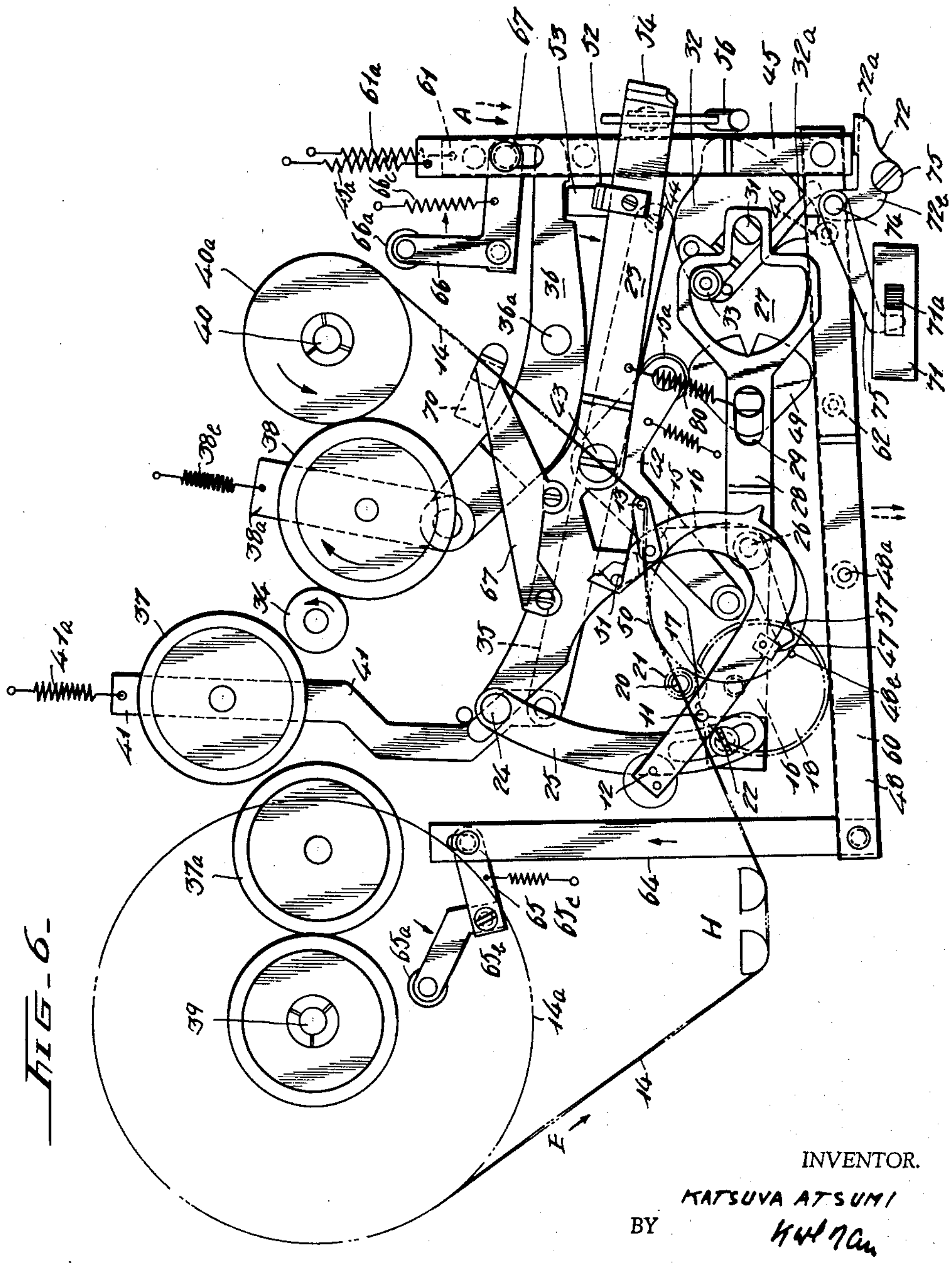
FIG. 6 is a plan view of a part of the mechanism shown in FIG. 1, wherein the first switch or control knob has been switched manually to its quick feeding position.

Switch 71 is provided with a switching piece 71*a*, preferably shaped in a push button, and when the piece is shifted to the left as in the case of FIG. 1, the circuit is closed and vice versa. In the proximity of this switch, there is a turnable member or bellcrank lever 72, which is turnably supported by a pin 73 fixedly mounted on chassis 10. One arm 72*a* of the bellcrank 72 is formed so as to cooperate with the linked or lower end of the connecting rod 45 when seen in FIG. 1, while the opposite arm 72*b* is linked with a pawl piece 75 by means of a pin 74. With the rod 45 positioned in its inoperative position as shown in FIG. 1, the pawl 75 is kept free from contact with switching piece 71*a*. However, when the rod 45 is projected downwardly in FIG. 1 to actuate the motion-receiving arm 72*a* of the bellcrank so as to turn clockwise, the hooked end of the pawl is caused to shift to the righthand direction in that figure, so that the switch 71 is positively kept in its inoperative position as shown in FIG. 6, thus the drive motor circuit being cut-off. Under these conditions, an intentional or non-intentional effort to open the switch will result in vain. This condition is clearly shown in FIGS. 6 and 7.

What it is desired to start the machine, a main switch 76 is closed and thus current will flow from an A.C. source to the circuit to energize the main motor M in FIG. 10. By this manipulation, the main drive shaft 34 will turn in the counterclockwise direction and the capstan spindle 20 is also brought into turning in the same direction as in the conventional way.

When the first control knob 77 (FIG. 9) together with switch shaft 31 and cam 32 is turned a predetermined angle in the clockwise direction from "STOP" to "FORWARD" position as shown by an imaginary line 77*a*, the cam acts upon the follower 46 to move it in unison with the mounting lever 60 in the direction as illustrated by a small arrow A in FIG. 1, thereby the idler 38 is brought into operative contact with both the upper most larger diameter portion of drive shaft 34 and the disc 40*a* of take-up spindle 40, provided that the brake lever 23 is kept in its inoperative position, thus the fast winding operation will take place.

In this case, the stopper roll 33 will occupy the upper extreme position as shown in FIG. 6 and the projection 32*a* on cam 32 will exert a clockwise turning force upon the upper lever 48 so that the related connecting rod 45 is shifted downwardly in FIG. 6 and to its operative position as shown in the same figure. By this movement, the "sleeping" switch 71 is locked at its operative position by pawl 75 as already described, so that any actuation of switching member 71*a* is positively prevented. Simultaneously, the brake means 65–65*b* and 65–65*a* are brought into their off-service position.

Figure 7:
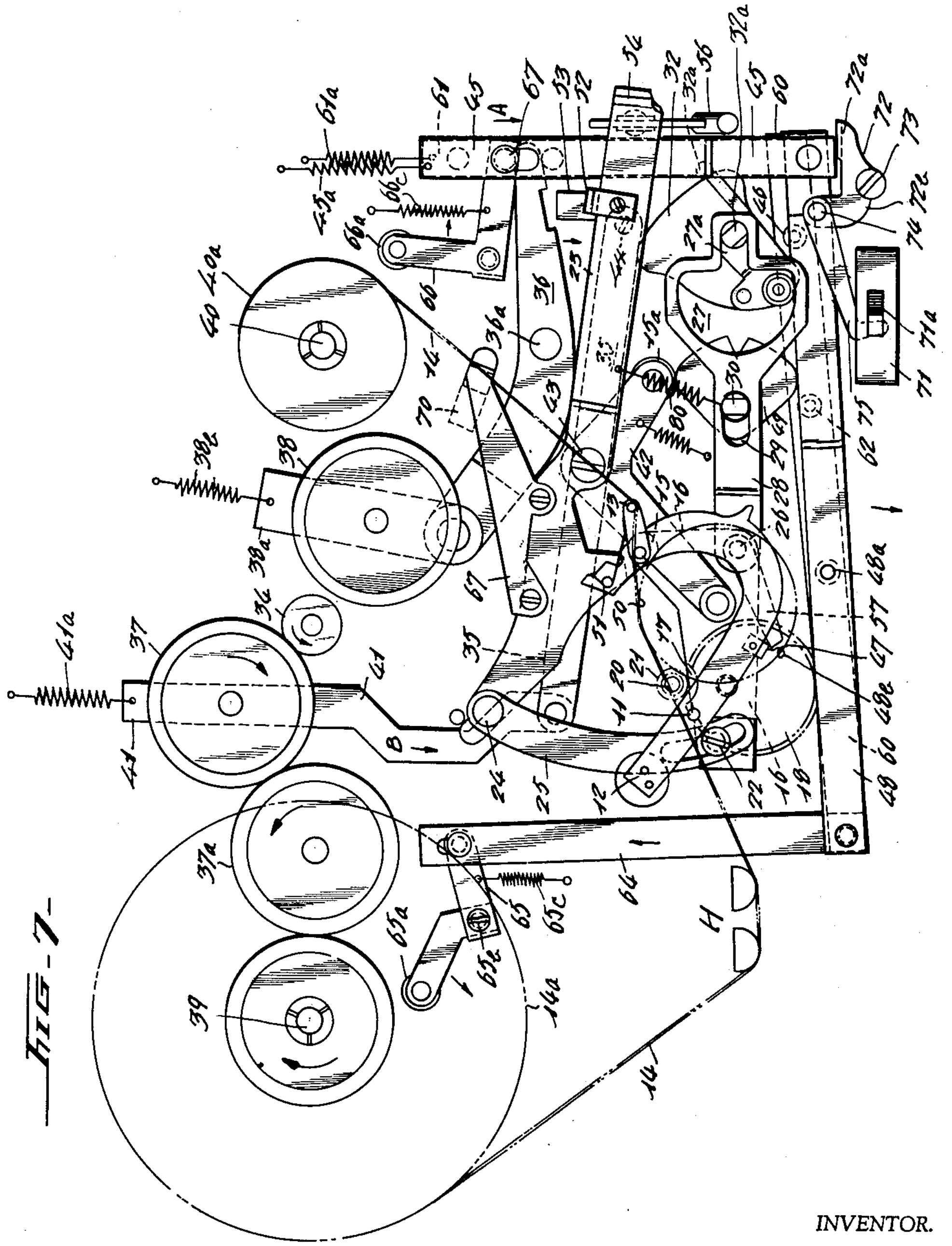
FIG. 7 is a similar view to FIG. 6, wherein however the first control knob has been set to its rewinding position.
Figure 8:
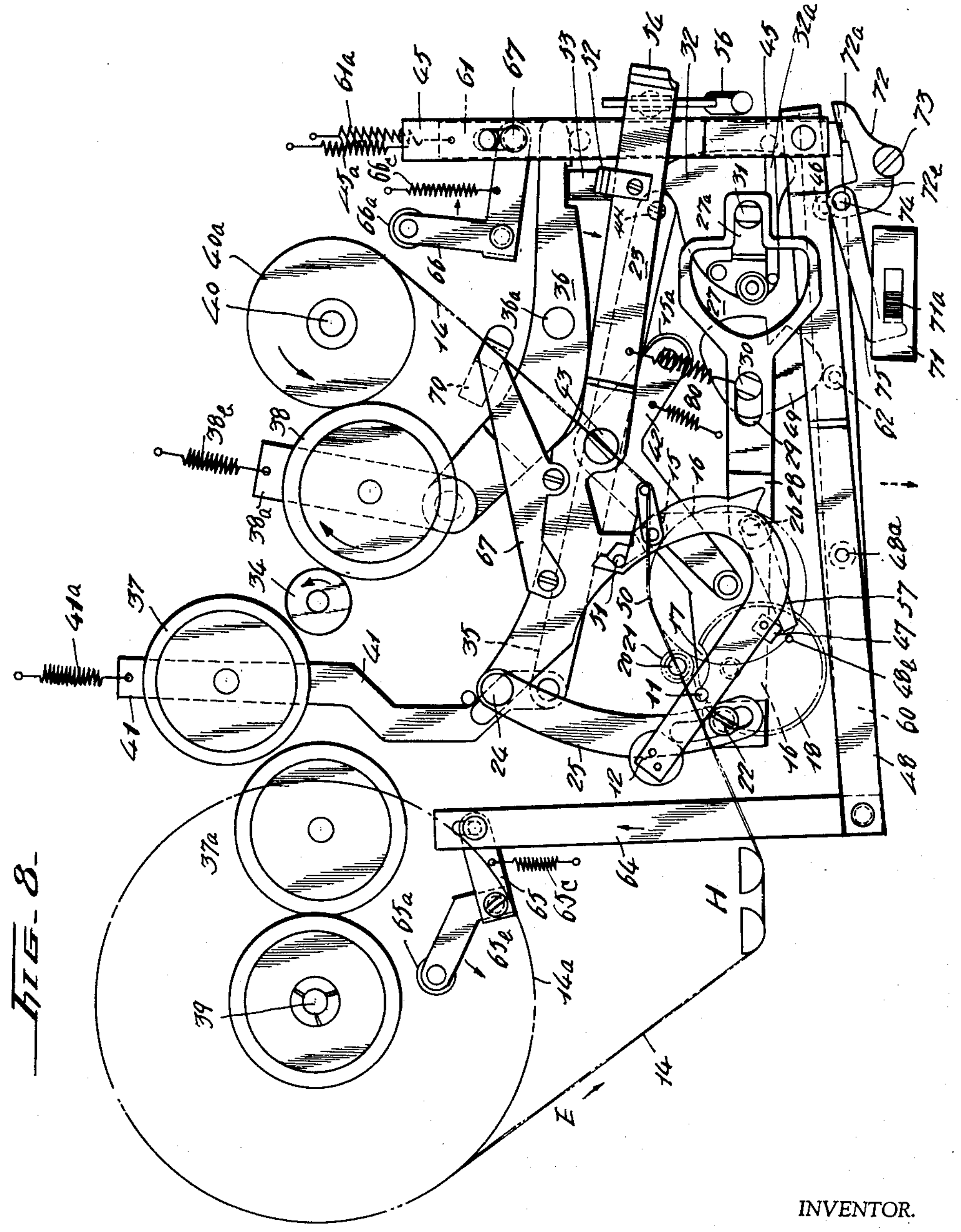
FIG. 8 is a similar view to FIG. 6, wherein however the first control knob has been brought into its playback position.

On the contrary, when the first control knob 77 together with switch shaft 31 is turned from its "STOP" position a definite angle in the counter-clockwise direction "REWINDING" position in FIG. 9 until the stopper 33 is brought to the opposite extreme position as illustrated in FIG. 7, the rocker arm 48 is caused to rotate in the clockwise direction as before under the influence of the turning effort by the cam projection 32*a*, thus in the similar way as above, the both brake means are brought into their off-service position as shown, and the "sleeping" switch is kept in its operating or conductvie position. In addition, however, the rocking arm 35 is caused to rotate about its pivot 43 in the counter-clockwise direction B by virtue of the cooperation of the follower 44 with the cam rise 32*a*, so that motion is transmitted from the drive shaft 34 through the idlers 37 and 37*a* to the supply spool shaft 39 for actuation thereof to rewind the tape at a high speed.

When its is desired to make the above explained novel mechanism ready for operation, the lever 12 is turned manually from the completely inoperative position in engagement with a stop pin 63 (which may be the top end of pivot 48*a*), as hinted in FIG. 1 by an imaginary line 12*a*, in the counter-clockwise direction to the position shown by the full line in the same figure so as to bring the feeler 13 into engagement with the tape 14. In this condition, the feeler 13 and thus the hook 12 is kept in a floating condition under the influence of a returning spring (not shown). Then, the machine is operated as in the conventional way.

If the tension in the tape 14 should be considerably reduced or should disappear by, for instance, a tape breakage or the termination thereof, the force acting upon the feeler 13 from the tape will be substantially or completely released, thereby the lever 12 being caused to rotate about its pivot 11 in the clockwise direction by the action of the said returning spring. By virtue of this turning movement, a blade member or pusher 47 (FIG. 2) depending from the lever 12 will act upon a pin 48*b* fixed on the wheel 18, which is thus caused to rotate in the direction shown by an arrow D to some degree, and thus brought into engagement with capstan gear 21 (FIG. 3), which has been idling by virtue of recess 17 (FIGS. 1 and 4). Upon thus engaged, the wheel 18 is caused to turn eccentrically substantially a complete revolution in the clockwise direction, since the capstan gear together with capstan spindle 20 is turning in the counter-clockwise direction, thereby the pivot moves at first downwards in FIGS. 1 and 4 and then upwards to the original position shown in FIG. 1. In other words, the rocker 16 is first caused to rotate about its pivot 15 in the counter-clockwise direction and then in the opposite direction. It will be clear that in this case, the lever 28 linked to rocker 16 is caused to advance rightwards in FIG. 4 as hinted by an arrow C and then to return in the opposite direction. By the first advancing stroke, follower roller 33 is urged to move inwards to the central position, thereby the switch stem 31 being caused to return to its shut-off position.

By the first turning movement of rocker 16, motion is also transmitted therefrom through the connecting rod 25 to the brake lever 23 so as to turn counter-clockwise about its pivot 43 against the action of a tension spring 80 into its operative position shown by full lines in FIG. 12, so that the microswitch 70 is closed as in the above described way, through the intermediary of actuating members 67 and 68. It should be noted that in this case the previously described lock for the sleeping switch has been completely released by the returning operation of cam 32, so that the opening of the microswitch will cause the drive motor circuit to be de-energized, as supposed from FIG. 10.

When it is desired to release the tape drive mechanism from the thus brought about stop conditions, a push button 56 is depressed so as to rotate a lever 55 counter-clockwise in FIG. 3, thereby urging to move the related end 54 of brake lever 23 upwardly, enough to disengage the actuator 52 from the stop 53, as illustrated by full line in the same figure. The brake lever 23 is then automatically turned clockwise under the influence of spring means to its off-brake position shown in FIG. 1. At the same time the released lever 36 is caused to turn clockwise about its pivot 36*a* under the influence of the tension spring 38*b* so that both idler 38 and pinch roller 50 return to their operative position. It is clear that in this case, the microswitch has been closed again.

For the prevention of reverse rotation of the toothed wheel 18, a checker 57 is provided so as to cooperate with the pin 48*b*, should the wheel turn in the counter-clockwise direction. The checker may, however, escape, as in the case of the pusher blade 47, from its operative position, when the wheel is caused to turn clockwise as above mentioned, since the pusher is mounted pivotably and normally held in its operative position by a spring and a stop, although not shown.

When it is desired to initiate the playback, the second knob 78 is manually turned clockwise from its "NEUTRAL" to "PLAYBACK" position in FIG. 9, while the first knob 77 is kept in its "STOP" position. As commonly known to those skilled in the art, conventional interlock means are arranged between the said both knobs so as to prevent any manipulation of the second knob into its "PLAYBACK" or "RECORDING" position from taking place, while the first knob is positioned in its any operative position. Since this feature does not constitute any part of the invention, such means has not been illustrated herein. Upon the manipulation of the second knob in the above described way, the switch stem 30 together with its attached cam turns the same angle and thus the pinch roll 50 is brought into operative engagement with the capstan 20 by virtue of the cam 49 kept in pressure engagement with a follower 15*a* on the arm 42 under the influence of spring 15*b* so as to rotate it in the clockwise direction in FIG. 1. Simultaneously, the idler wheel 38 is also brought into contact with both drive spindle 34 and take-up spool 40*a*, which is shown diagrammatically as the take-up spindle disc for simplicity in the drawing, thus providing the possibility of playing back at a lower speed, as in the conventional technique. It will also be appreciated that if the tension in the tape should disappear or be reduced considerably, the aforementioned automatically mechanical and electrical stopping operation will be also invited. In this case, the cam 49 acts upon the follower roll 62 on lever 48 so as to turn the latter clockwise, so that the brake means 66–66*c* is also brought into its inoperative position as in the aforementioned way, while the opposite brake means 65–65*a* is kept in its operative position.

In the case of recording, the second knob 78 is manually further advanced to its extreme "RECORDING" position. In this case, the mechanical and electrical arrangements so far illustrated are kept in the same conditions as described for the playback operation. Only difference is an alteration in the electrical connections for the magnetic head assembly H. But this feature may be conventional and does not constitute any part of the present invention, so that detail description thereof has been omitted herein.

It will be clear from the foregoing that a sudden release of tension in the tape should happen to take place by a certain case such as tape breakage, tape, termination or the like, while either in recording or in playing back, the emergency stop lever may be instantly and automatically brought into operation to stop the running tape, and only thereafter to simultaneously shut-off the current source. A careless play-back running of the tape recorder overnight, for instance, without noticing the termination of the tape can be thus effectively prevented by the emergency stop mechanism constructed according to the invention and in a unique mechano-electric way.

It will be understood that modifications and variations of the invention disclosed herein may be resorted to without departing from the scope of the concepts of the present invention. Therefore, the scope of the invention should be limited only by the scope and proper interpretation of the claims appended hereto.

What I claim is:

1. The combination with a tape recorder having a supply reel and a take-up reel for winding and unwinding a magnetic tape, first drive means, and an electric motor for driving the same having an operating circuit; of an electric switch in said circuit, first adjustable coupling means for selectively coupling said take-up and supply reels with said drive means, for rapid forward and rewinding of said tape, first control means for said coupling means actuatable between an inoperative position and winding and rewinding positions, respectively, second drive and adjustable coupling means connected thereto to directly operate said tape for recording and play-back by unwinding from said supply reel and winding unto said take-up reel, second independent control means operably connected with both said first and second coupling means and actuatable between an inoperative and an operative position, to establish and disestablish driving connection of said tape with said second drive means and of said take-up reel with said first drive means, respectively, braking means for both said supply and take-up reels having a common operating member, spring-loaded feeler means normally resiliently engaging said tape, release mechanism controlled by said feeler means to operate both said first and second coupling means to inoperative position and actuate said braking means upon release of the tension on said tape, to disestablish driving connecnection of said tape by said first and second coupling means, respectively, an actuator for said switch upon said member, whereby to open said switch and to interrupt said circuit upon actuation of said release mechanism, and means to suspend the effectiveness of said switch by said first coupling means in its operative position for rapid forward and rewinding of said tape.

2. In a tape recorder as claimed in claim 1, said last-mentioned means being comprised of a further normally open switch connected in parallel to said first switch, and actuating means therefor controlled by said first coupling means, to close said further switch during the rapid forward and rewinding position of said first coupling means.

3. The combination with a tape recorder having a supply reel and a take-up reel for winding and unwinding a magnetic tape, drive means and an electric motor for driving the same having an operating circuit; of a first microswitch connected in said circuit, adjustable multiple coupling means for selectively coupling said take-up and supply reels with said drive means, for rapid forward and rewinding of said tape, first control means for said coupling means actuatable between an inoperative position and winding and rewinding positions, respectively, a drive capstan and an adjustable pressure roller therefor to directly drive said tape during recording and play-back by unwinding from said supply reel and winding upon said take-up reel, second independent control means operably connected with both said roller and coupling means and actuatable between an inoperative position and an operative position, to establish and disestablish driving connection of said tape with said capstan and of said drive means with said take-up reel, respectively, braking means for both said supply and take-up reels having a common operating member, spring-loaded feeler means normally resiliently engaging said tape, release mechanism controlled by said feeler means to operate said coupling means and pressure roller and actuate said braking member to operative position upon release of the tension of said tape, to disestablish driving connection of said tape with said roller and of said coupling means with said take-up reel, respectively, an actuator for said switch upon said member, whereby to open said switch and to interrupt said circuit upon actuation of said release mechanism, and a second microswitch connected in parallel to said first switch and having an actuator arranged for control by said coupling means to be closed thereby during the rapid forward and rewinding positions of said coupling means.

4. The combination with a tape recorder having a supply reel and a take-up reel for winding and unwinding a magnetic tape; of drive means, adjustable coupling means for selectively coupling said take-up reel and said supply reel with said drive means for rapid forward winding and rewinding of said tape, respectively, first control means for said coupling means having an inoperative position and winding and unwinding positions, respectively, a drive capstan and adjustable pressure roller to drive said tape during recording and play-back by unwinding from said supply reel and winding upon said take-up reel, second independent control means for both said roller and said coupling means to establish and disestablish driving connection between said tape and said capstan and between said drive means and said take-up reel, respectively, release mechanism comprising a spring-loaded lever having a stationary pivot at one end and carrying a feeler at its opposite end resiliently engaging said tape in its tensioned condition during recording, playback, rapid forward and rewinding, a rocker plate having a stationary pivot, a capstan gear, a further gear for cooperation therewith being eccentrically rotatably mounted upon said plate and having a relative small peripheral multilated gear section positioned normally relative to said capstan gear close to the position of meshing engagement of said gears, actuating means upon said lever and said further gear to operate said further gear into meshing engagement with said capstan gear by said lever being deflected upon cessation of the tape tension upon said feeler, whereby to rotate said further gear through a full revolution and to operate said plate through a predetermined oscillating path, braking means for said supply and take-up reels, means controlled by said plate to actuate said coupling means and said braking means to disestablish driving connection of said reels, further means also controlled by said plate to actuate said second control means to disestablish driving connection of said tape with said capstan and of said take-up reel with said coupling means, respectively, an electric motor for driving said drive means having an operating circuit, a first microswitch in said circuit having an actuator arranged for control by said braking means, to open said switch and to interrupt said circuit upon actuation of said release mechanism, and a second microswitch connected in parallel to said first switch and having an actuator arranged for operation by said coupling means to close said second microswitch during rapid forward and rewinding of said tape.

References Cited in the file of this patent

UNITED STATES PATENTS

| | | |
|---|---|---|
| 1,919,607 | Thompson | July 25, 1933 |
| 2,661,163 | Greene | Dec. 1, 1953 |